US008451548B2

(12) United States Patent
Liu et al.

(10) Patent No.: US 8,451,548 B2
(45) Date of Patent: May 28, 2013

(54) PROJECTION LENS SYSTEM WITH HIGH RESOLUTION AND COMPACT SIZE

(75) Inventors: Xiao-Na Liu, Guangdong (CN); Hai-Jo Huang, New Taipei (TW); Fang-Ying Peng, New Taipei (TW); An-Tze Lee, New Taipei (TW); Sheng-An Wang, New Taipei (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 33 days.

(21) Appl. No.: 13/291,108

(22) Filed: Nov. 8, 2011

(65) Prior Publication Data

US 2013/0100544 A1    Apr. 25, 2013

(30) Foreign Application Priority Data

Oct. 19, 2011  (CN) .......................... 2011 1 0318169

(51) Int. Cl.
*G02B 13/04* (2006.01)
*G02B 9/04* (2006.01)
*H04N 5/225* (2006.01)

(52) U.S. Cl.
USPC ............................ 359/749; 348/340; 359/793

(58) Field of Classification Search
CPC .......... G02B 13/16; G02B 13/22; G02B 13/04; G02B 13/18
USPC .................. 348/340; 359/736, 749, 753, 793
See application file for complete search history.

(56) References Cited

U.S. PATENT DOCUMENTS

2012/0314303 A1* 12/2012 Liu et al. ....................... 359/717

FOREIGN PATENT DOCUMENTS

CN          101135767 A    3/2008

* cited by examiner

*Primary Examiner* — David N Spector
(74) *Attorney, Agent, or Firm* — Altis Law Group, Inc.

(57) ABSTRACT

A projection lens system includes, in order from the magnified side to the reduced side thereof, a first lens group with negative refractive power, a second lens group with a positive refracting power, and a spatial light modulator. The projection lens system satisfies the following condition: 3.478<BFL/F<3.528. Wherein: BFL is a back focal length of the projection lens system; F is an effective focal length of the projection lens system.

14 Claims, 4 Drawing Sheets

PROJECTION LENS SYSTEM WITH HIGH RESOLUTION AND COMPACT SIZE

BACKGROUND

1. Technical Field

The present disclosure relates to projection lenses and, particularly, to a projection lens system providing high resolution with reduced overall length.

2. Description of Related Art

In order to obtain a clear projected image and reduce the size of projectors, such as, digital light processing (DLP) projectors, liquid crystal display (LCD) projectors, and liquid crystal on silicon (LCoS) projectors, projection lens systems with high resolution and short overall length are needed. But factors affecting both the resolution and the overall length of the projection lens system, such as the number and position of lenses employed, the refractive power distributions of the employed lenses, and the shapes of the employed lenses, are complicated. For example, reducing the number of lenses can shorten the overall length of the projection lens system, but the resolution of the projection lens system will suffer; conversely, increasing the number of lenses of the projection lens system can increase the resolution of the projection lens system, but the overall length of the projection lens system is increased.

What is needed, therefore, is a projection lens system which can overcome or at least alleviate the above problems.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Embodiments of the present disclosure will now be described in detail below, with reference to the accompanying drawings.

Figure 1:
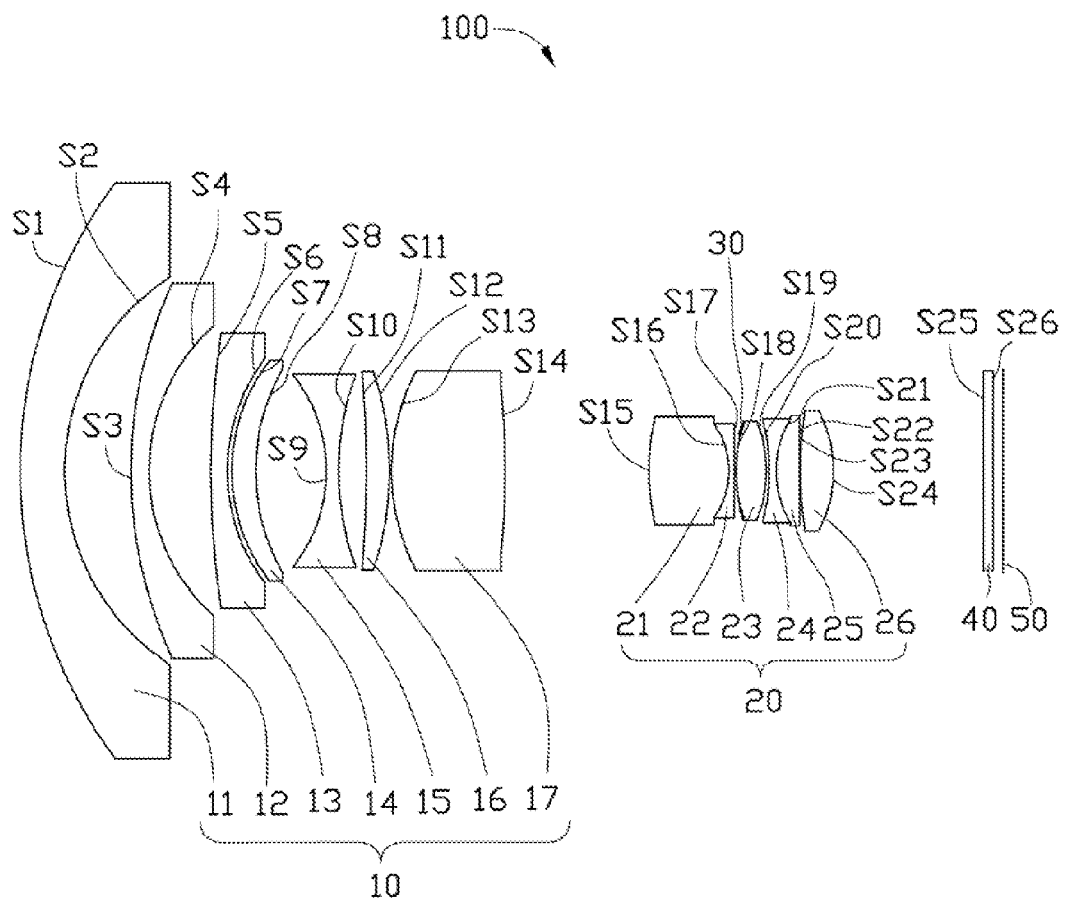
FIG. 1 is a schematic view of a projection lens system according to the present disclosure.

Referring to FIG. 1, a projection lens system 100 according to the present disclosure is described. The projection lens system 100 with positive refracting power includes, in order from the magnified side to the reduced side of the projection lens system 100, a first lens group 10, a second lens group 20, an aperture stop 30, and a cover glass 40. The first lens group 10 in negative refracting power and the second lens group 20 in positive refracting power are configured to project a wide-angle and large image in a limited space.

In the embodiment, the projection lens system 100 is utilized in a digital light processing (DLP) projector. A spatial light modulator (SLM) 50, for example, a digital micro-mirror device (DMD), modulates light signals for projection through the projection lens system 100. The light signals are transmitted through the cover glass 40, the second lens group 20, and the first lens group 10 in sequence, and then projected onto a surface (not shown) to display images.

The first lens group 10 includes a first lens 11 having a negative refracting power, a second lens 12 having a negative refracting power, a third lens 13 having a negative refracting power, a fourth lens 14 having a positive refracting power, a fifth lens 15 having a negative refracting power, a sixth lens 16 having a positive refracting power, and a seventh lens 17 having a positive refracting power.

In order from the magnified side to the reduced side of the projection lens system 100, the first lens 11 includes a first surface S1 and a second surface S2; the second lens 12 includes a third surface S3 and a fourth surface S4; the third lens 13 includes a fifth surface S5 and a sixth surface S6; the fourth lens 14 includes a seventh surface S7 and an eighth surface S8; the fifth lens 15 includes a ninth surface S9 and a tenth surface S10; the sixth lens 16 includes an eleventh surface S11 and a twelfth surface S12; the seventh lens 17 includes a thirteenth surface S13 and a fourteenth surface S14. In the embodiment, the first surface S1, the second surface S2, the seventh surface S7 and the eighth surface S8 are all aspherical surfaces. The third surface S3, the fourth surface S4, the fifth surface S5, the sixth surface S6, the ninth surface S9, the tenth surface S10, the eleventh surface S11, the twelfth surface S12, the thirteenth surface S13, and the fourteenth surface S14 are all spherical surfaces.

The second lens group 20 includes, in order from the magnified side to the reduced side of the projection lens system 100, an eighth lens 21 having a positive refracting power, a ninth lens 22 having a negative refracting power, a tenth lens 23 having a positive refracting power, an eleventh lens 24 having a negative refracting power, a twelfth lens 25 having a positive refracting power, and a thirteenth lens 26 having a positive refracting power.

The eighth lens 21 and the ninth lens 22 are attached together to form a single unit. The eleventh lens 24 and the twelfth lens 25 are also attached together to form a single unit.

In order from the magnified side to the reduced side of the projection lens system 100, the eighth lens 21 includes a fifteenth surface S15 and a sixteenth surface S16; the ninth lens 22 includes the sixteenth surface S16 and a seventeenth surface S17; the tenth lens 23 includes an eighteenth surface S18 and a nineteenth surface 19; the eleventh lens 24 includes a twentieth surface S20 and a twenty-first surface S21; the twelfth lens 25 includes the twenty-first surface S21 and a twenty-second surface S22; the thirteenth lens 26 includes a twenty-third surface S23 and a twenty-fourth surface S24. In the embodiment, both the twenty-third surface S23 and the twenty-fourth surface S24 are aspherical surfaces. The fifteenth surface S15, the sixteenth surface S16, the seventeenth surface S17, the eighteenth surface S18, the nineteenth surface 19, the twentieth surface S20, the twenty-first surface S21, and the twenty-second S22 are all spherical surfaces.

The aperture stop 30 is installed between the ninth lens 22 and the tenth lens 23. The aperture stop 30 adjusts the light flux from the tenth lens 23 to the ninth lens 22. In addition, the aperture stop 30 facilitates a uniform light transmission when light passes through the tenth lens 23, to correct chromatic aberrations of the lens system 100. To minimize the cost of manufacture and to reduce the total length of the lens system 100, the aperture stop 30 can be a film of opaque material adhesively positioned on the periphery of the eighteenth surface S18 of the tenth lens 23.

To minimize the cost of manufacture, both the first lens 11 and the fourth lens 14 are made of resin, the other lens are all made of glass.

The cover glass 40 includes, in order from the magnified side to the reduced side of the projection lens system 100, a twenty-fifth surface S25 and a twenty-sixth surface S26. The cover glass 40 is configured for adjusting the light path and protecting a magnified-side surface of the SLM 50.

In order to obtain low distortion, good imaging quality and a compact configuration, the projection lens system 100 satisfies the following condition:

$$3.478 < BFL/F < 3.528; \quad (1)$$

wherein BFL is the back focal length of the projection lens system 100; F is the effective focal length of the projection lens system 100. The back focal length of the projection lens system 100 is equal to the distance between the twenty-fourth surface S24 of the thirteenth lens 26 and the magnified-side surface of the SLM 50.

Condition (1) limits the back focal length of the projection lens system 100 to allow other optical elements of the projector (e.g. a filter) to be installed between the thirteenth lens 26 and the SLM 50.

In the embodiment, the lens system 100 further satisfies the following condition:

$$-7.3 < F1/F < -6.8; \quad (2)$$

wherein, F1 is the focal length of the first lens group 10; F is the effective focal length of the projection lens system 100.

Condition (2) can favorably limit the relationship between the focal length of every lens group and the focal length of the projection lens system 100 to obtain a high resolution.

The above aspherical surfaces are shaped according to the formula:

$$Z = \frac{ch^2}{1+\sqrt{1-(k+1)c^2h^2}} + \sum A_i h^i$$

wherein Z is the length of a line drawn from a point on the aspherical surface to the tangential plane of the aspherical surface, h is the height from the optical axis to the point on the aspherical surface, c is a vertex curvature (=1/R, the radius of curvature), k is a conic constant, and Ai are the correction coefficients, to the order of "i" of the aspherical surface.

The following symbols are used.

$F_{No}$: F number;
2ω: field angle;
ri: radius of curvature of the surface Si;
Di: distance between surfaces on the optical axis of the surface Si and the surface Si+1;
Ni: refractive index of the surface Si;
Vi: Abbe constant of the surface Si;
F: effective focal length of the projection lens system 100;
PL: projecting distance of the projection lens system 100;
F1: focal length of the first lens group 10;
F2: focal length of the second lens group 20; and
L: total length of the projection lens system 100.

Tables 1-3 show the specifications of an exemplary embodiment of the projection lens system 100.

TABLE 1

| Surface | ri(mm) | Di(mm) | Ni | Vi |
|---|---|---|---|---|
| S1 | −160.396 | 4.78 | 1.525279 | 55.95076 |
| S2 | 23.209 | 7.174 | — | — |
| S3 | 48.355 | 1.9267 | 1.846663 | 23.7848 |
| S4 | 21.069 | 6.672 | — | — |
| S5 | 99.0437 | 1.7692 | 1.568882 | 62.9518 |

TABLE 1-continued

| Surface | ri(mm) | Di(mm) | Ni | Vi |
|---|---|---|---|---|
| S6 | 20.23928 | 0.498 | — | — |
| S7 | 27.230 | 2.558 | 1.607265 | 26.6466 |
| S8 | 38.538 | 7.6397 | — | — |
| S9 | −16.945 | 1.28979 | 1.496997 | 81.608379 |
| S10 | 30.0880693 | 3.0269 | — | — |
| S11 | −110.80095 | 2.48915 | 1.805181 | 25.45643 |
| S12 | −33.694 | 0.17228 | — | — |
| S13 | 23.231 | 12.27 | 1.59551 | 39.1794 |
| S14 | −91.71 | 9.4496 | — | — |
| S15 | 24.7 | 8.709 | 1.523073 | 58.64 |
| S16 | −8.563 | 0.5133 | 1.8348 | 42.72067 |
| S17 | −1753.46 | 0.1797 | — | — |
| S18 | 18.1367 | 3.287515 | 1.59551 | 39.179 |
| S19 | −14.2398 | 0.33 | — | — |
| S20 | −20.2637 | 0.69768 | 1.801004 | 34.967 |
| S21 | 11.16195 | 2.5279 | 1.487489 | 70.441164 |
| S22 | −1686.08 | 0.0917 | — | — |
| S23 | 41.2247 | 3.5901721 | 1.497103 | 81.55958 |
| S24 | −12.664544 | 0.8025 | — | — |
| S25 | infinite | 1.05 | 1.5168 | 64.167336 |
| S26 | infinite | 1.1 | — | — |
| IMA | infinite | — | — | — |

TABLE 2

| Surface | Aspherical coefficient |
|---|---|
| S1 | K = 0; A4 = 1.84452E−5; A6 = 4.2911029E−9; A8 = −3.440352E−11; A10 = 2.270998E−14; A12 = 4.0811396E−17; A14 = −6.46432E−20; A16 = 2.737839E−23 |
| S2 | K = 0; A4 = −3.753909E−5; A6 = 2.0302E−7; A8 = −1.26578E−10; A10 = −1.9390E−12; A12 = 3.9028E−15; A14 = −1.9600E−18; A16 = −1.41055E−21 |
| S7 | K = 0; A4 = 3.340194E−5; A6 = 1.147184E−7; A8 = −5.704538E−9; A10 = 7.558344E−13; A12 = −8.6176E−14; A14 = −4.62372E−16; A16 = 5.17604E−18 |
| S8 | K = 0; A4 = 8.512044E−5; A6 = 5.461107E−7; A8 = 3.5622185E−9; A10 = −7.733116E−11; A12 = −3.531576E−13; A14 = 4.94605E−15; A16 = −9.84303E−18 |
| S23 | K = 0.59073; A4 = 1.4828E−5; A6 = −1.8237402E−6; A8 = 9.3760382E−8; A10 = −7.721845E−10; A12 = −9.0986448E−11; A14 = 2.9188E−12; A16 = −2.88009E−14 |
| S24 | K = 0.1693; A4 = 1.2541371E−4; A6 = −2.568842E−6; A8 = 1.847041E−7; A10 = −6.0741983E−9; A12 = 1.020574E−10; A14 = −6.8234E−13; A16 = −1.7065387E−15 |

TABLE 3

| F(mm) | $F_{No}$ | PL (mm) | F1 (mm) | F2 (mm) | L (mm) | BFL (mm) | 2ω (degree) |
|---|---|---|---|---|---|---|---|
| 6.9 | 2.6 | 1000 | −47.11 | 25.122 | 105.92 | 24.26 | 115.76 |

Figure 2:
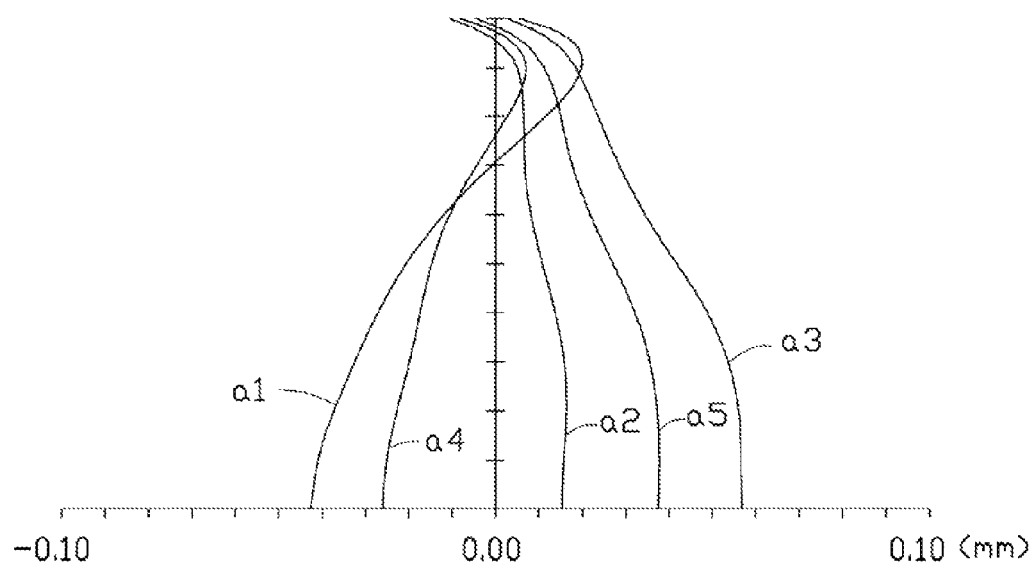
FIG. 2 is a diagram showing the spherical aberration of the projection lens system according to an exemplary embodiment.
Figure 3:
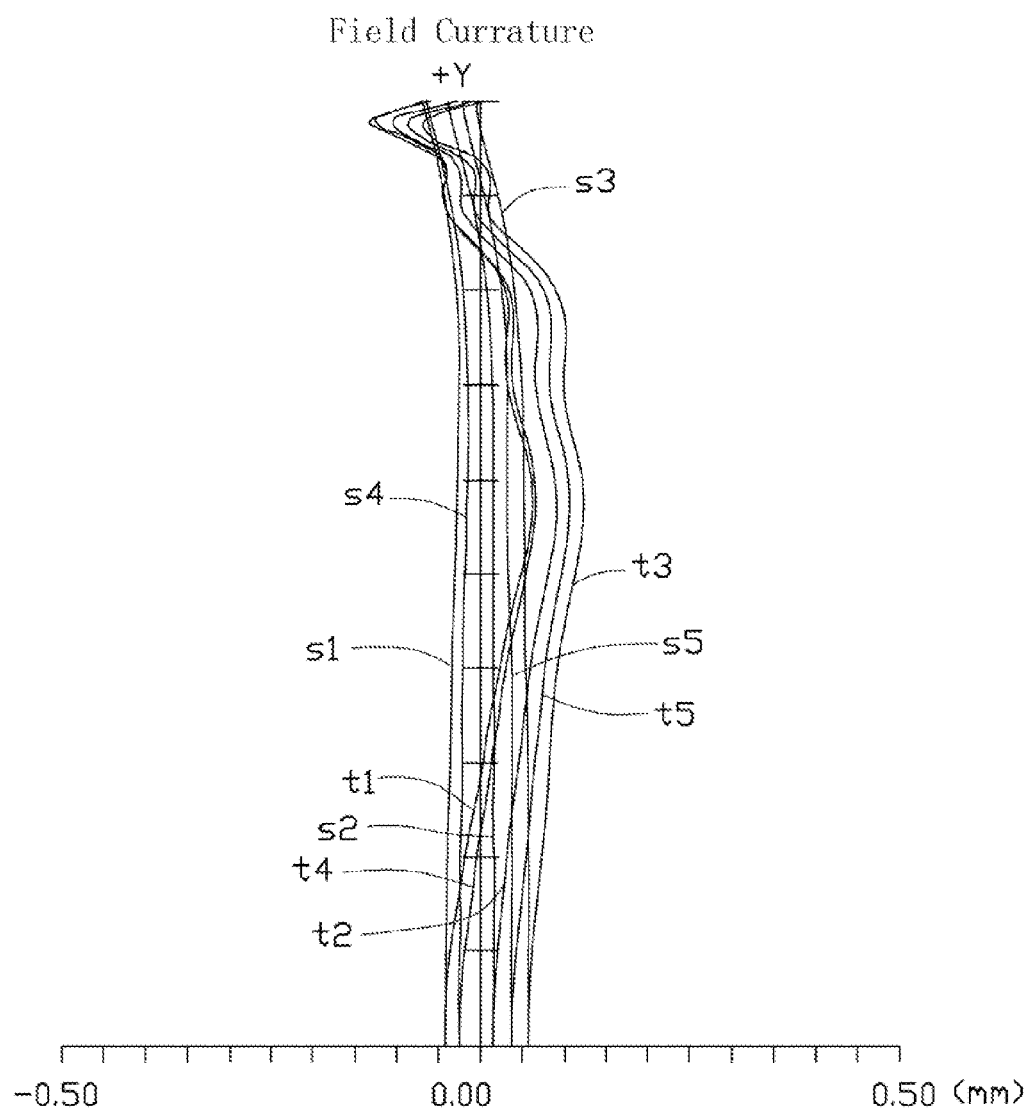
FIG. 3 is a diagram showing the field curvature of the projection lens system according to the exemplary embodiment.
Figure 4:
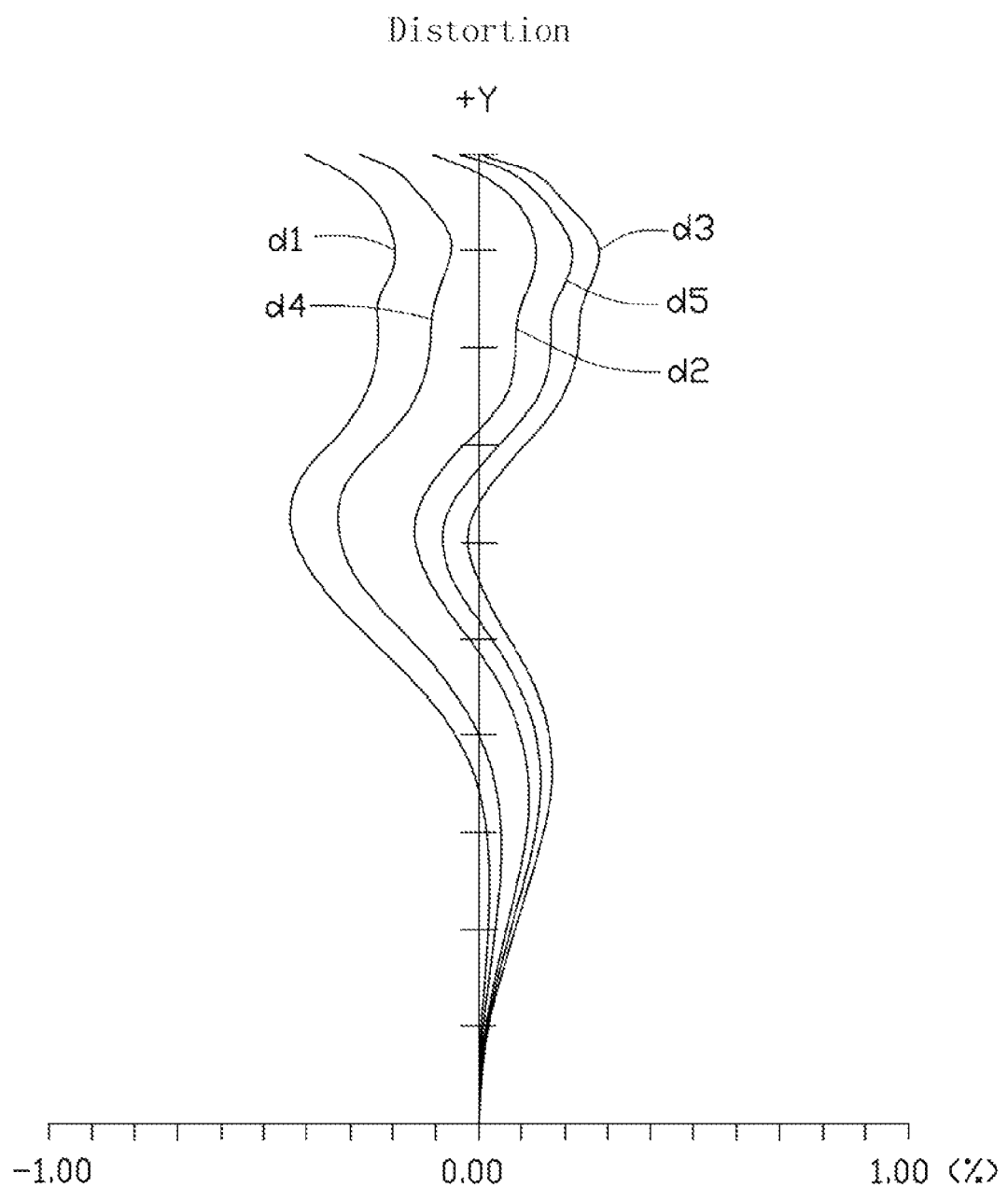
FIG. 4 is a diagram showing distortion values of the projection lens system according to the exemplary embodiment.

FIGS. 2-4, are graphs of particular aberrations (spherical aberration, field curvature, distortion, and lateral chromatic aberration) of the projection lens system 100. In FIG. 2, the curves represent the spherical aberration characteristics of a1 light (wavelength: 450 nm), a2 light (wavelength: 550 nm), a3 light (wavelength: 630 nm), a4 light (wavelength: 480 nm), and a5 light (wavelength: 590 nm) of the projection lens system 100. The spherical aberrations of the lens system 100 is from −0.1 mm to 0.1 mm. As illustrated in FIG. 3, the curves t1~t5 and s1~s5 are respectively the tangential field curvature curve and the sagittal field curvature curve. The field curvature of the lens system 100 is from −0.5 mm to 0.5 mm. In FIG. 4, the distortion of the lens system 100 is from −1% to 1%.

In the embodiment, although the overall length of the projection lens system 100 is very much reduced, any aberrations inherent in the projection lens system 100 are maintained within an acceptable range. That is, the projection lens system 100 keeps chromatic aberrations at a minimum whilst reducing the total length of the projection lens system 100.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A projection lens system, in the order from the magnified side to the reduced side thereof, comprising:
a first lens group with a negative refracting power;
a second lens group with a positive refracting power; and
a spatial light modulator;
wherein the projection lens system satisfies the following condition:

$$3.478 < BFL/F < 3.528;$$

where BFL is the back focal length of the projection lens system, and F is the effective focal length of the projection lens system.

2. The projection lens system of claim 1, wherein the projection lens system further satisfies the condition: $-7.3 < F1/F < -6.8$, where F1 is the focal length of the first lens group.

3. The projection lens system of claim 1, wherein a focal length of the first lens group is −47.11 mm, a focal length of the second lens group is 25.122 mm.

4. The projection lens system of claim 1, wherein a projecting distance of the projection lens system is 1000 mm.

5. The projection lens system of claim 1, wherein the first lens group comprises a first lens having a negative refracting power, a second lens having a negative refracting power, a third lens having a negative refracting power, a fourth lens having a positive refracting power, a fifth lens having negative refracting power, a sixth lens having positive refracting power, and a seventh lens having positive refracting power.

6. The projection lens system of claim 5, wherein both the first lens and the fourth lens are made of resin.

7. The projection lens system of claim 5, wherein both the first lens and the fourth lens are aspherical lenses.

8. The projection lens system of claim 5, wherein the second lens, the third lens, the fifth lens, the sixth lens, and the seventh lens are spherical lenses.

9. The projection lens system of claim 1, wherein the second lens group comprises, in order from the magnified side to the reduced side of the projection lens system, an eighth lens having positive refracting power, a ninth lens having a negative refracting power, a tenth lens having positive refracting power, an eleventh lens having negative refracting power, a twelfth lens having positive refracting power, and a thirteenth lens having positive refracting power.

10. The projection lens system of claim 9, wherein the eighth lens and the ninth lens are attached together to form a single unit, the eleventh lens and the twelfth lens are attached together to form a single unit.

11. The projection lens system of claim 9, wherein the eighth lens, the ninth lens, the tenth lens, the eleventh lens, and the twelfth lens are spherical lenses.

12. The projection lens system of claim 9, wherein the thirteenth lens is an aspherical lens.

13. The projection lens system of claim 9, further comprising an aperture stop, wherein the aperture stop is installed between the ninth lens and the tenth lens.

14. The projection lens system of claim 13, wherein the aperture stop is a film of opaque material adhesively positioned on the periphery of a surface of the tenth lens closing to the ninth lens.

* * * * *